(12) United States Patent  
Teipen (10) Patent No.: US 7,789,623 B2
(45) Date of Patent: Sep. 7, 2010

(54) PROTECTION ARRANGEMENT FOR A WIND TURBINE

(75) Inventor: Ewald Teipen, Lingen (DE)

(73) Assignee: General Electric Company, Schenectady, NY (US)

( * ) Notice: Subject to any disclaimer, the term of this patent is extended or adjusted under 35 U.S.C. 154(b) by 71 days.

(21) Appl. No.: 12/261,595

(22) Filed: Oct. 30, 2008

(65) Prior Publication Data

US 2010/0109333 A1     May 6, 2010

(51) Int. Cl.
*F03D 11/00* (2006.01)

(52) U.S. Cl. .................. 415/232; 415/1; 416/244 R (58) Field of Classification Search ............ 416/244 R, 416/248; 415/113, 232, 1; 277/549, 572, 277/607, 616, 635
See application file for complete search history.

(56) References Cited

U.S. PATENT DOCUMENTS

| | | | | |
|---|---|---|---|---|
| 1,839,549 A | * | 1/1932 | Haller et al. | ............... 184/4 |
| 2,554,652 A | * | 5/1951 | Welborn | ................. 74/44 |
| 4,522,564 A | * | 6/1985 | Carter et al. | ............ 416/140 |
| 4,671,519 A | * | 6/1987 | Bras et al. | ............... 277/559 |
| 5,244,569 A | * | 9/1993 | Di Amico | ............... 210/163 |

* cited by examiner

*Primary Examiner*—Ninh H Nguyen
(74) *Attorney, Agent, or Firm*—Global Patent Operation; Douglas D. Zhang (57) ABSTRACT

A protection arrangement for a wind turbine including a tower, a machine nacelle having a yaw drive and a mounting hole into which an upper end of the tower extends, and a rotor having at least one rotor blade and a hub is provided. The protection arrangement includes a drip pan having a rim surrounding the mounting hole and adapted to collect grease from an interior of the machine nacelle and a flexible collar adapted to fit around the upper end of the tower and having an outer diameter being larger than the diameter of the mounting hole of the machine nacelle. The flexible collar is adapted to pass through the mounting hole into the interior of the machine nacelle.

16 Claims, 11 Drawing Sheets

PROTECTION ARRANGEMENT FOR A WIND TURBINE

BACKGROUND

The present disclosure generally relates to wind turbines as an environmentally safe and relatively inexpensive alternative energy source. In particular, the present disclosure relates to a protection device for a wind turbine which is adapted to protect the environment of the wind turbine from contamination which is caused by grease and/or oil and/or other contaminating materials emitted from the machine nacelle of a wind turbine.

A wind turbine basically includes a tower, a machine nacelle including a yaw drive and a rotor having at least one rotor blade and a hub. The yaw drive is provided with oil and grease in order to maintain an efficient and energy-saving yawing of the wind turbine. As wind turbines are known as an environmentally safe alternative energy source, any contamination of the environment caused by wind turbines should be avoided.

SUMMARY

In view of the above, a protection arrangement for a wind turbine including a tower, a machine nacelle having a yaw drive and a mounting hole into which an upper end of the tower extends, and a rotor having at least one rotor blade and a hub is provided, said protection arrangement further including a drip pan having a rim surrounding the mounting hole and adapted to collect grease from an interior of the machine nacelle, and a flexible collar adapted to fit around the upper end of the tower and having an outer diameter being larger than the diameter of the mounting hole of the machine nacelle, wherein the flexible collar is adapted to pass through the mounting hole into the interior of the machine nacelle.

According to another aspect a collar adapted for sealing a mounting hole in a machine nacelle of a wind turbine and to fit around an upper end of a tower of the wind turbine is provided, wherein the collar is flexible and adapted for being inserted into an interior of the machine nacelle via the mounting hole.

According to yet another aspect a method for protecting a wind turbine including a tower, a machine nacelle having a yaw drive and a mounting hole into which an upper end of the tower extends, and a rotor having at least one rotor blade and a hub is provided, said method further including the steps of providing a drip pan having a rim surrounding the mounting hole and adapted to collect grease from an interior of the machine nacelle, providing a flexible collar adapted to fit around the upper end of the tower and having an outer diameter being larger that the diameter of the mounting hole of the machine nacelle, and mounting the machine nacelle onto the tower, wherein the flexible collar passes through the mounting hole into the interior of the machine nacelle.

Further exemplary embodiments are according to the dependent claims, the description and the accompanying drawings.

DRAWINGS

A full and enabling disclosure of the present invention, including the best mode thereof, to one of ordinary skill in the art is set forth more particularly in the remainder of the specification including reference to the accompanying drawings wherein.

DETAILED DESCRIPTION

Reference will now be made in detail to the various exemplary embodiments, one or more examples of which are illustrated in the drawings. Each example is provided by way of explanation and is not meant as a limitation. For example, features illustrated or described as part of one embodiment can be used on or in conjunction with other embodiments to yield yet a further embodiment. It is intended that the present disclosure includes such modifications and variations.

A number of embodiments will be explained below. In this case, identical structural features are identified by identical reference symbols in the drawings. The structures shown in the drawings are not depicted true to scale, but rather serve only for the better understanding of the embodiments.

Figure 1:
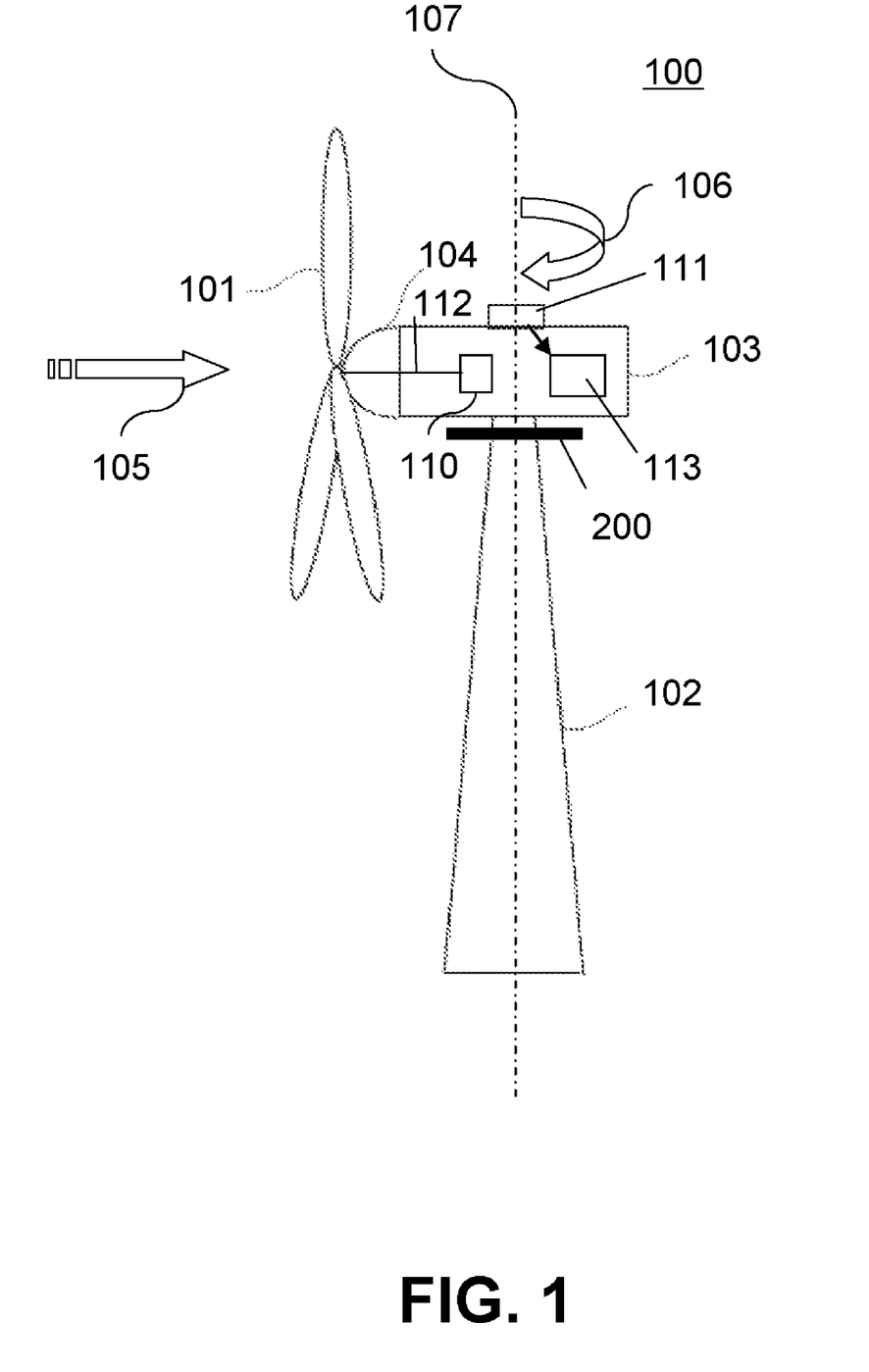
FIG. 1 shows a wind turbine including a tower, a machine nacelle having a yaw drive and a rotor having at least one rotor blade and a hub, the wind turbine being provided with a protection device according to a typical embodiment.

FIG. 1 shows a wind turbine 100 including a tower 102, a machine nacelle 103 and a rotor having at least one rotor blade 101 and a hub 104. The rotor is connected to a main shaft axis 112 which drives a mechanical gear box 110.

Typically, the machine nacelle 103 is arranged rotatably atop the tower 102 such that the machine nacelle 103 together with the rotor having the rotor blades 101 can be adjusted with respect to the incoming wind direction 105. As the machine nacelle 103 has to be moveable with respect to the tower 102, grease and/or oil and/or other contamination contained in the machine nacelle might drop on the ground due to grease and/or oil and/or other contamination leakage.

In order to adjust the machine nacelle 103, which is rotatably arranged atop the tower 102, with respect to the incoming wind direction 105, a yaw angle 106 can be adjusted by means of a yaw drive unit 113.

The yaw drive unit 113 acquires a control signal from a wind direction sensor 111 which is used to determine the direction of the incoming wind 105. In order to rotate the machine nacelle 103 which is arranged atop the tower 102 about a vertical axis 107, the yaw drive unit 113 has to change the yaw angle 106. As the yaw drive unit includes a mechanical arrangement of gears, bearings etc., typically a certain amount of grease and/or oil is provided for the mechanically moving components.

The grease and/or oil and/or other contamination may drop from the mechanical components towards the bottom of the machine nacelle 103 and furthermore, as the machine nacelle 103 is arranged rotatably atop the tower 102, along the tower towards ground. In order to avoid environmental contamination due to grease and/or oil and/or other contamination from the yaw drive unit 113 and other mechanical components, a protection device 200 is provided which is described in more detail with reference to FIGS. 2 and 3 herein below.

Figure 2:
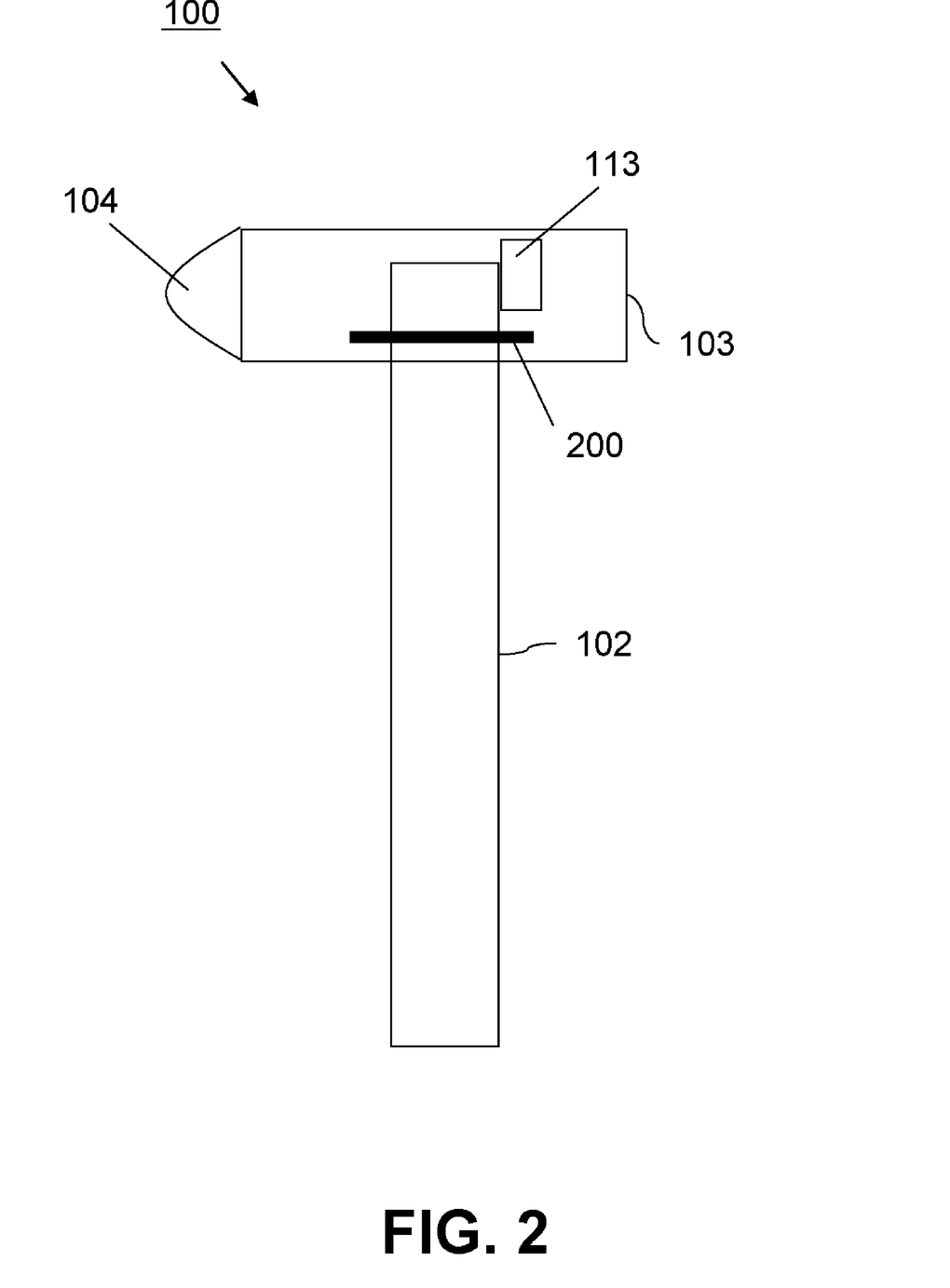
FIG. 2 is a illustrative side view of the wind turbine showing a part of interior components of the machine nacelle together with the protection device according to a typical embodiment.

FIG. 2 shows a side view of a wind turbine 100 having a machine nacelle 103 arranged rotatably atop a tower 102. At the machine nacelle, a rotor having rotor blades (not shown) and a hub 104 is rotatably arranged. A yaw drive unit 113 is schematically shown by a rectangular box. Grease and/or oil and/or other contamination which falls from the mechanical components of the yaw drive unit 113 towards ground is collected by the protection device 200 which is attached as annular element around the tower 102 and fixed to the tower 102.

Therefore, during the rotation of the machine nacelle 103, the tower 102 together with the protection device 200 remains at a fixed rotational position whereas grease emitted by the yaw drive unit 113 is received by the protection device 200 and cannot drop onto the ground or along the tower 102.

Figure 3:
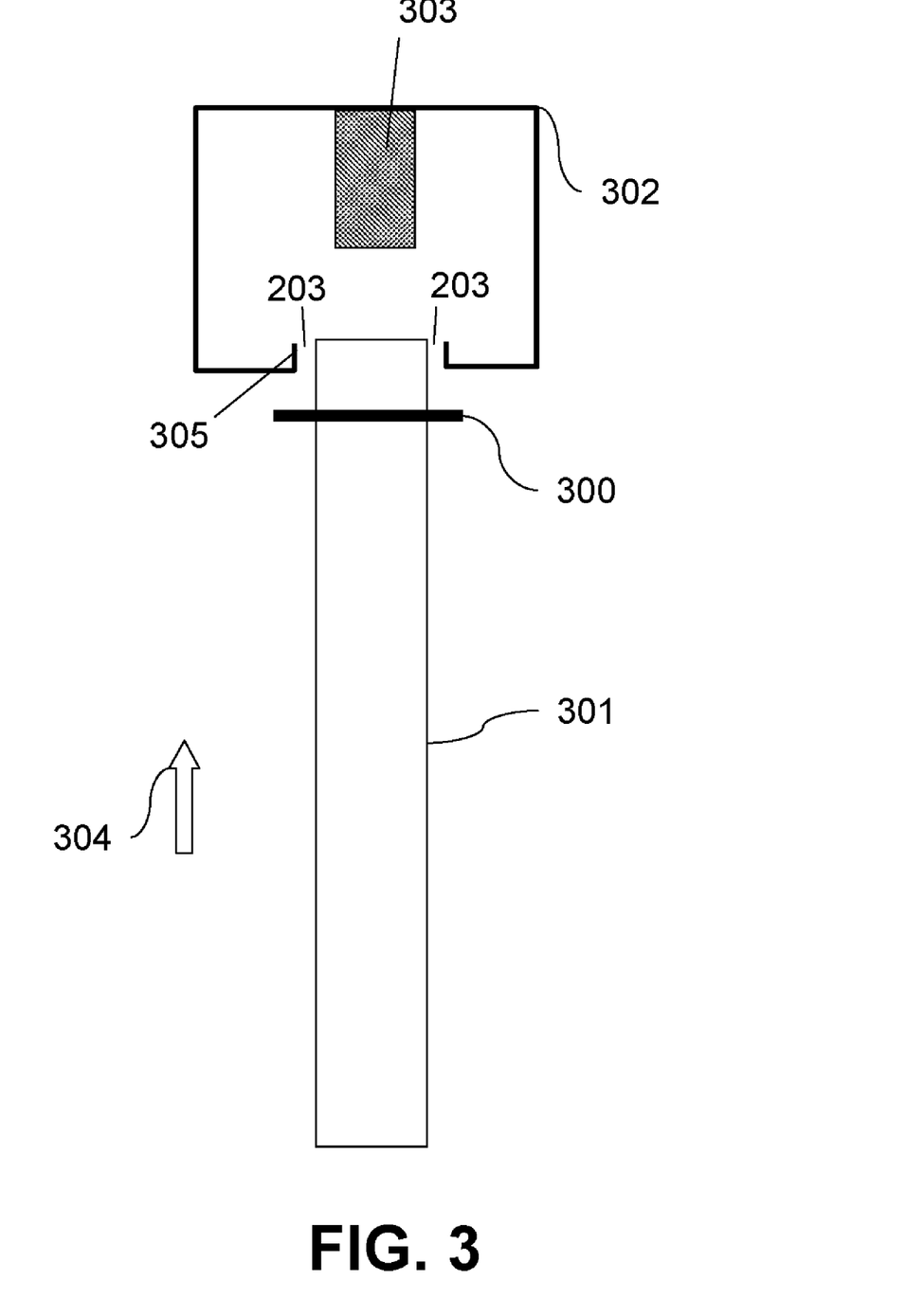
FIG. 3 illustrates a sealing device for sealing a chamber to be sealed according to another typical embodiment.

FIG. 3 shows the principle of sealing a chamber to be sealed in more detail. As shown in FIG. 3, a support unit 301 which includes a flexible sealing device 300 is inserted in a direction 304 into a chamber to be sealed 302. The sealing device 300 may be provided as a flexible collar.

The chamber to be sealed may include a mounting unit 303 which is used for mounting the support unit 301. Furthermore the chamber to be sealed includes a sealing rim 305 which collects oil and/or grease and/or other contamination emitted from internal components of the chamber to be sealed 302 when oil and/or grease and/or other contamination proceeds towards the ground (opposite direction of insertion direction 304). As illustrated in FIG. 3 a gap 203 is provided between the tower 102 and the sealing rim 305.

The sealing rim 305 forms a kind of a drip pan which is adapted to collect e.g. grease, oil, other contamination, etc. from the interior of the chamber to be sealed 302. It is noted here that the sealing device 300 may be made from at least one of an elastic material, a foil having a supporting grid structure, and a steel lip in the form of a collar. This kind of flexible collar may comprise rubber. The drip pan, e.g. the sealing rim 305 of the chamber to be sealed 302, may be made from aluminum, glass fiber, carbon materials, glass fiber reinforced plastic, and other suitable materials. In the typical embodiment shown in FIG. 3, the flexible collar has a circular shape at the outer circumference.

Figure 4:
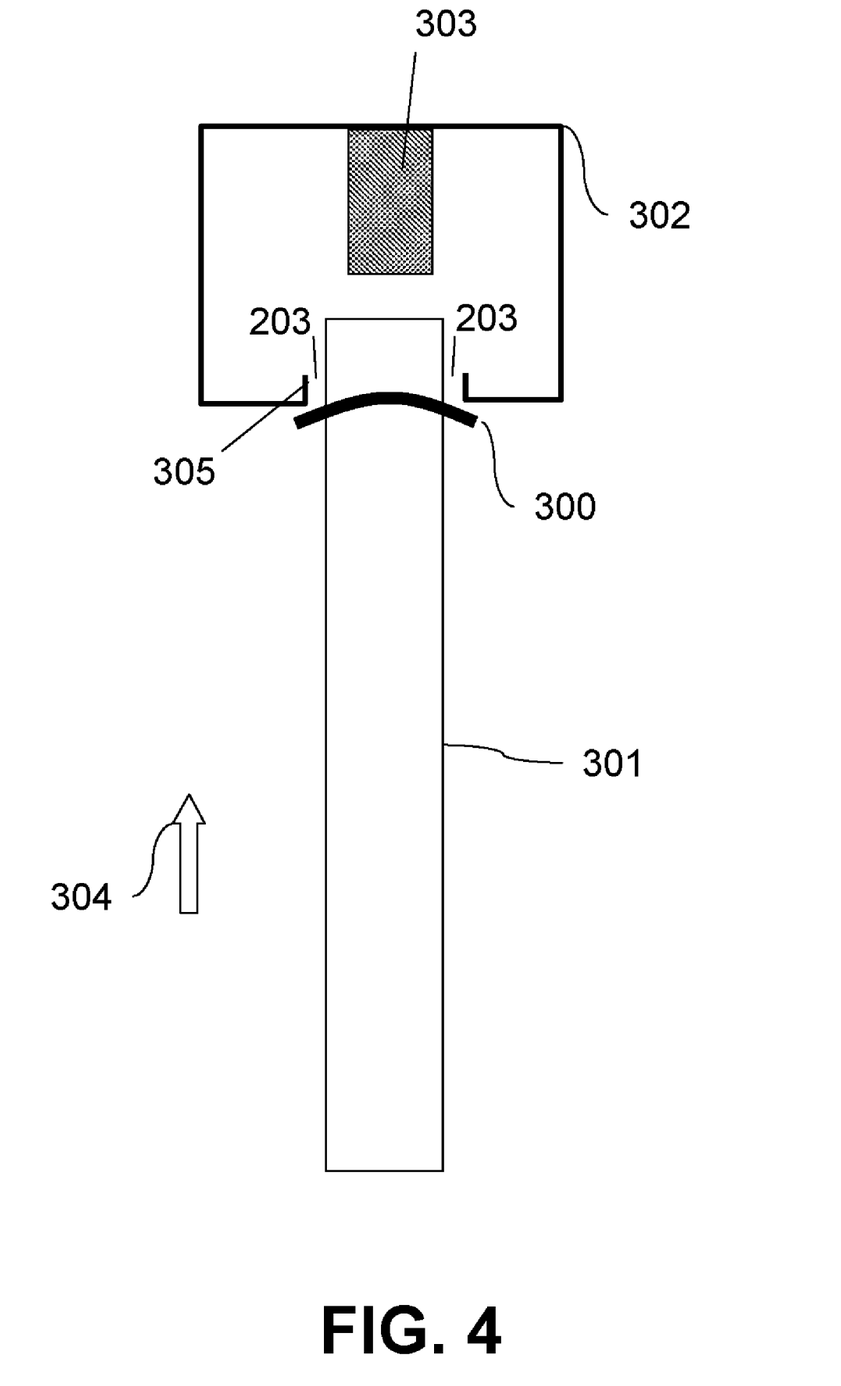
FIG. 4 illustrates the movement of the sealing device fixed at a support unit in an insertion direction towards the chamber to be sealed.

FIG. 4 illustrates the movement of the sealing device fixed at a support unit in an insertion direction towards the chamber to be sealed. FIG. 4 specifically shows the sealing device 300 of FIG. 1 after it has been moved further towards the chamber to be sealed 302 in the direction 304. As the sealing device 300 is made from at least one of an elastic material, a foil having a supporting grid structure, and a steel lip, the sealing device 300 may deform in order to pass through the hole of the chamber to be sealed 302 wherein the inner diameter of the hole is smaller than the outer diameter of the sealing device 300.

Figure 5:
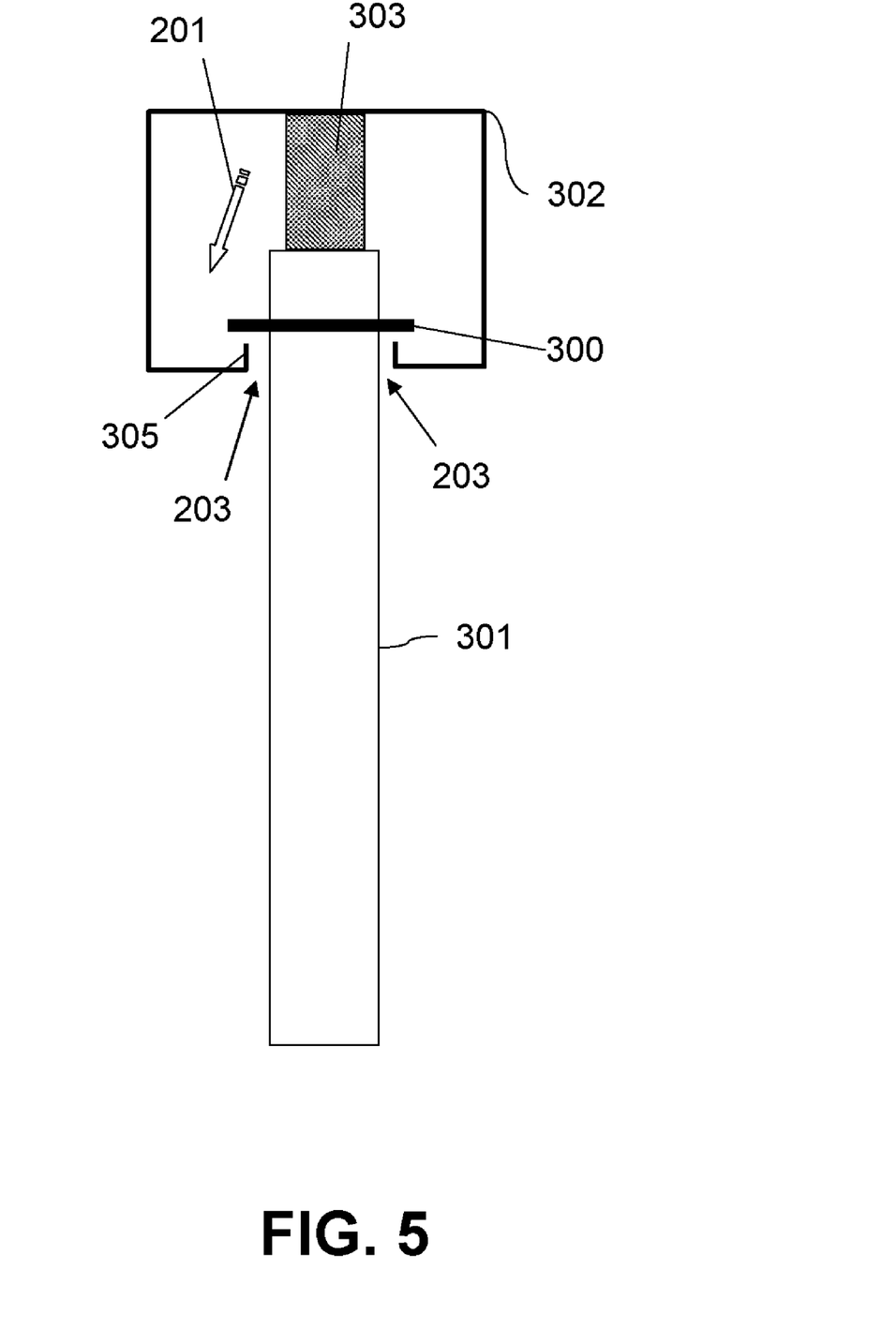
FIG. 5 shows the sealing device of FIGS. 3 and 4 after the sealing device has been inserted into the chamber to be sealed, according to a typical embodiment.

FIG. 5 shows the sealing device of FIGS. 3 and 4 after the sealing device has been inserted into the chamber to be sealed. In detail, FIG. 5 shows the situation when the sealing device 300 which is attached to the support unit 301 has been introduced into the chamber to be sealed 302 and has snapped back such that the sealing device 300 extends over the sealing rim 305 of the chamber to be sealed 302. Now it is possible to seal the chamber to be sealed by seating the sealing device 300 onto the sealing rim 305.

A mounting unit 303 is provided for fixing the support unit 301 to the chamber to be sealed 302. An arrow 201 indicates a grease and/or oil and/or other contamination flow under the influence of gravity (vertical direction downwards). As it is indicated in FIG. 5, grease flowing downwards is prevented from leaving the chamber to be sealed and from dropping along the support unit 301 towards ground.

Figure 6:
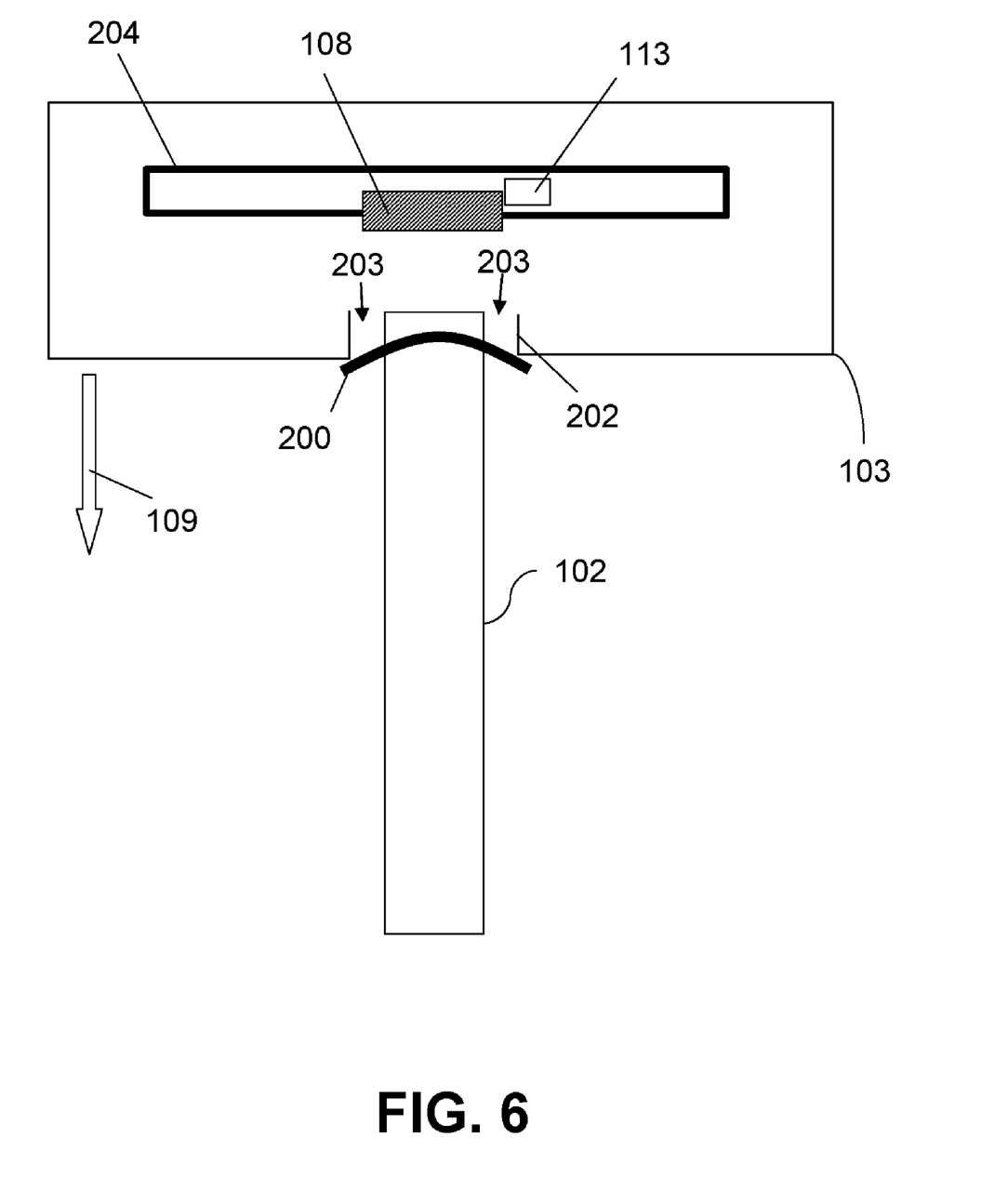
FIG. 6 illustrates the mounting of a machine nacelle of a wind turbine onto a tower in a mounting direction in a state where the protection device is being inserted into the machine nacelle.
Figure 7:
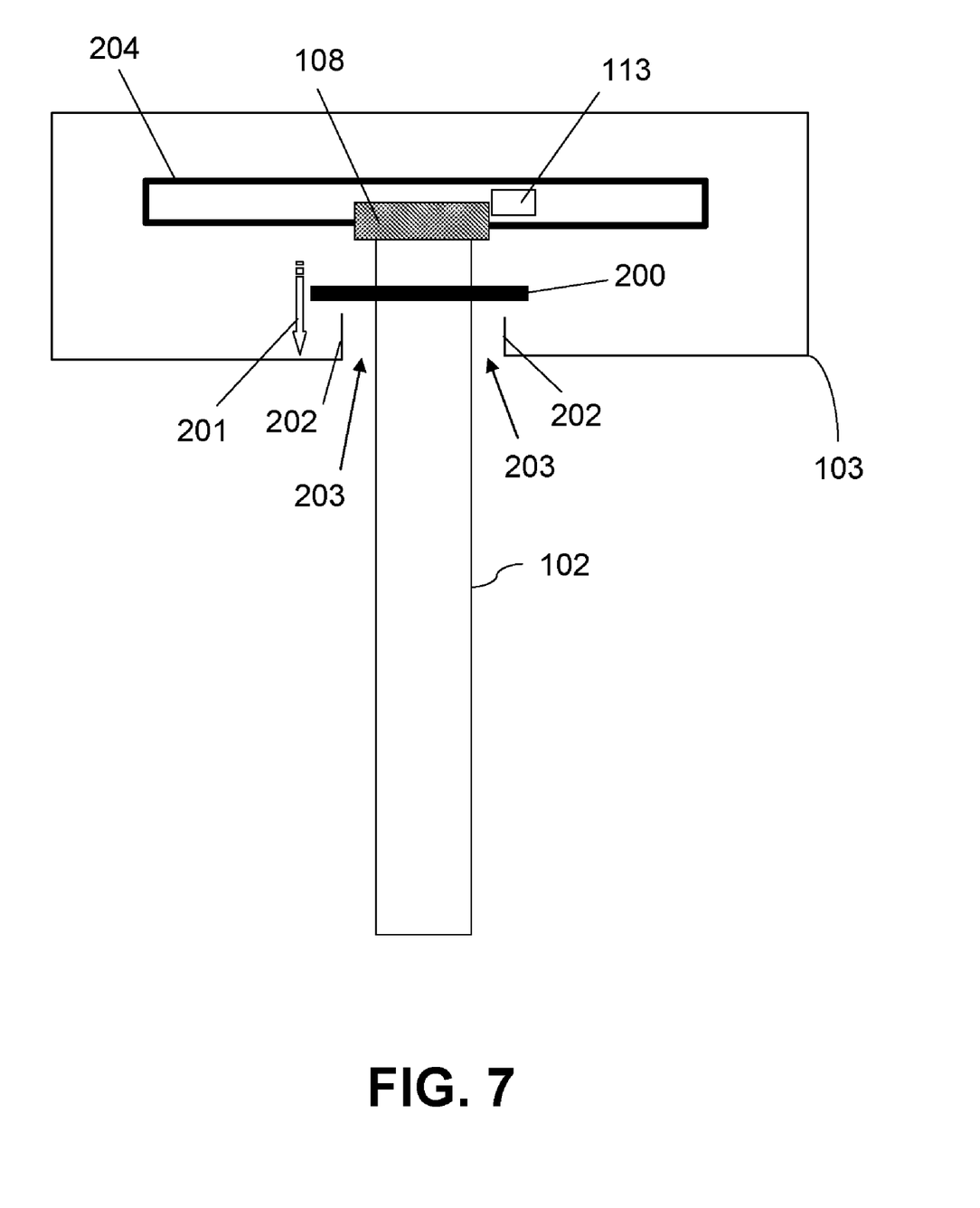
FIG. 7 shows the state where the protection device is inside the machine nacelle and grease and/or oil and/or other contamination is directed into the interior of the machine nacelle, according to a typical embodiment.

FIGS. 6 and 7 show a protection device 200 which has been described with respect to FIGS. 2 and 3 and its insertion into a machine nacelle in more detail.

FIG. 6 illustrates the mounting of a machine nacelle of a wind turbine onto a tower in a mounting direction in a state where the protection device is being inserted into the machine nacelle. As described with respect to FIGS. 4 and 5 (sealing device 300), the protection device 200 is made from flexible material which may bend when the machine nacelle 103 of a wind turbine 100 is lowered onto the tower 102 in a mounting direction 109. The machine nacelle 103 includes, amongst others, a yaw bearing 108 for rotatably arranging a bed plate 204 of the machine nacelle 103 atop the tower 102, and the yaw drive unit 113. The bed plate 204 is mounted at the yaw bearing 108 and may rotate about a typically vertical axis 107 (FIG. 1). Furthermore the bed plate 204 supports additional units such as the yaw drive unit and a housing of the machine nacelle 103.

The yaw drive unit 113 includes mechanical components which have to be provided with oil and/or grease. Furthermore, the machine nacelle 103 includes a drip pan 202 which is indicated as a rim 202 around a hole in the bottom part of the machine nacelle 103. When the machine nacelle 103 is lowered onto the tower 102, the protection device 200 deforms and passes through the bottom hole of the machine nacelle 103. Typically the protection device 200 is formed as a flexible collar which fits around the tower 102.

FIG. 7 shows the situation when the protection device 200 has passed through the bottom hole of the machine nacelle 103 and has snapped back in a straight horizontal position. Arrows 201 indicate a grease flow from mechanical components around the protection device 200 towards the drip pan 202. Thus, oil and/or grease emitted by mechanical components of the machine nacelle, e.g. by the yaw drive unit 113 and associated mechanical components, cannot drip towards ground and cannot flow along the tower 102 such that an environmental contamination is avoided. As illustrated in FIG. 7 a gap 203 is provided between the tower 102 and the drip pan 202.

A yaw bearing 108 is provided in order to rotatably arrange the machine nacelle 103 atop the tower 102. According to the typical embodiment of the protection device 200 shown in FIGS. 6 and 7, it is possible to arrange the protection device 200 at an upper end of the tower 102 before the machine nacelle 103 is mounted atop the tower 102. Thus, an easy and cost-effective installation of a sealing for sealing the machine nacelle can be provided.

Figure 8:
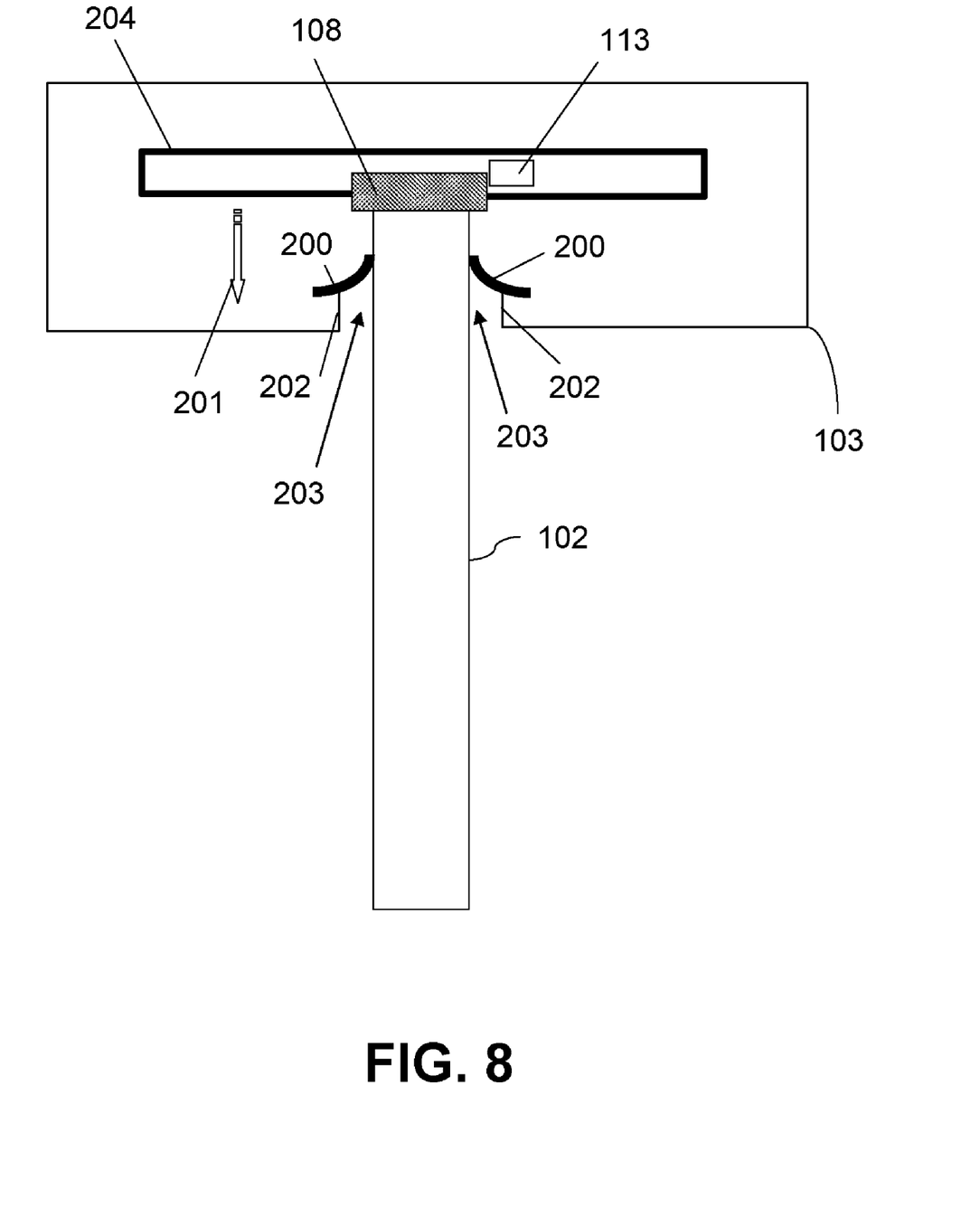
FIG. 8 shows the state where the protection device fixed at a drip pan of the machine nacelle is inside the machine nacelle and grease and/or oil and/or other contamination is directed into the interior of the machine nacelle, according to another typical embodiment.

FIG. 8 shows the state where the protection device is fixed at the drip pan 202 of the machine nacelle 103 in a state where the protection device 200 is inside the machine nacelle and grease and/or oil and/or other contamination is directed into the interior of the machine nacelle, according to another typical embodiment. In contrast to the arrangement shown in FIGS. 6 and 7, the protection arrangement 200 illustrated in FIG. 8 is fixed at the drip pan 202 of the machine nacelle 103 such that the protection arrangement may slide along the tower 102 of the wind turbine 100 when mounting the machine nacelle 103 atop the tower 102.

Figure 9:
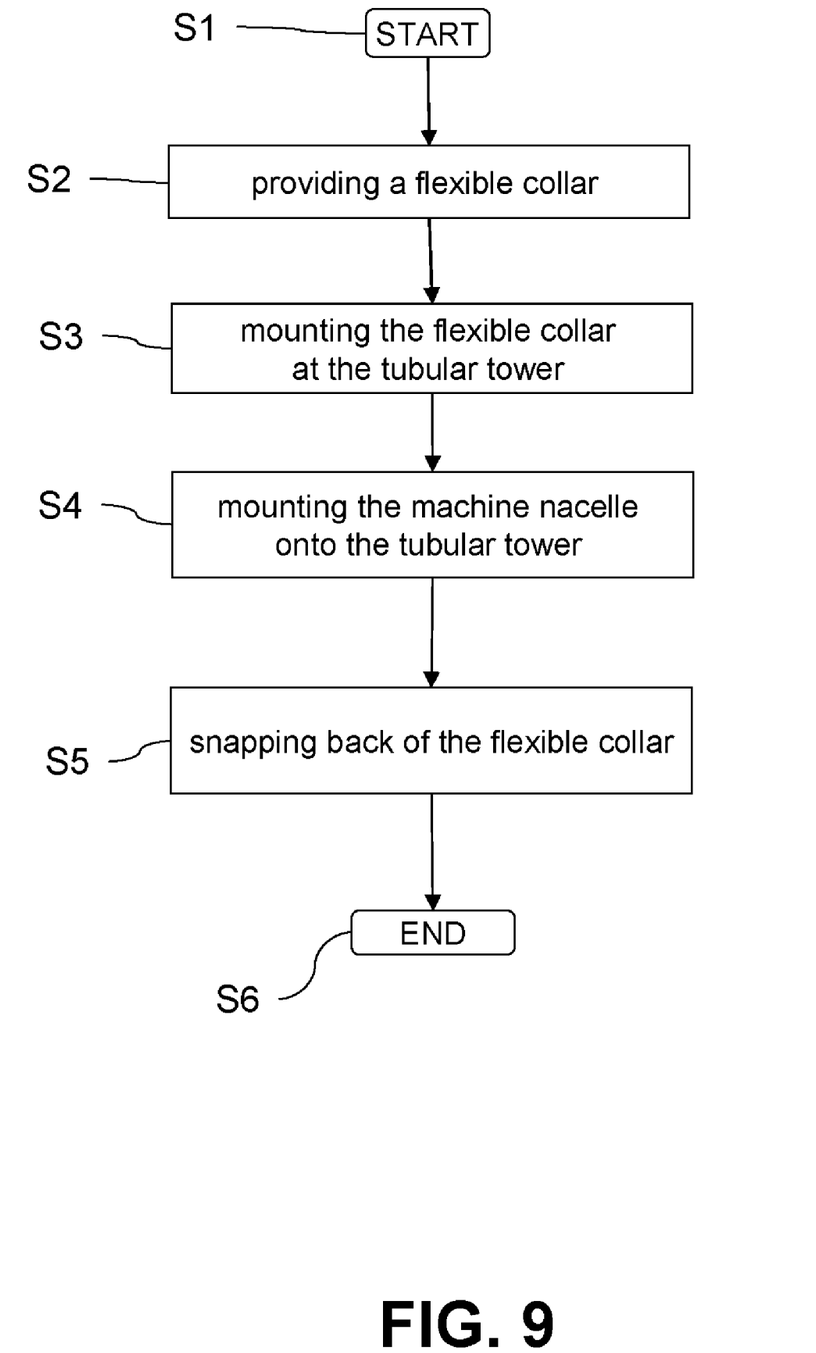
FIG. 9 is a flowchart illustrating a method for protecting a wind turbine from yaw drive grease, according to a typical embodiment.

FIG. 9 is a flowchart of a method for protecting a wind turbine and the environment from yaw drive grease. The method starts at a step S1 wherein at a step S2 a flexible collar is provided around a support unit. At step S3, the flexible collar is mounted at the support unit, e.g. a tower of a wind turbine. Then, the machine nacelle of the wind turbine is mounted onto the tower at step S4.

The flexible collar is deformed and passes through a bottom hole of the machine nacelle. Then, in step S5, the flexible collar, e.g. the protection device 200 shown in FIGS. 6 and 7, snaps back into a horizontal position (see FIG. 7). When the protection device (flexible collar) has snapped back into the horizontal position, the chamber to be sealed (e.g. the machine nacelle) has been sealed and the procedure is ended at step S6. The flexible collar adapted to fit around an upper end of the tower 102 may have an outer diameter which is larger than the diameter of a mounting hole (bottom hole) of the machine nacelle.

Then, grease and/or oil and/or any kind of other contamination emitted from components of the interior of the machine nacelle 103 is collected by means of the drip pan 202.

Figure 10:
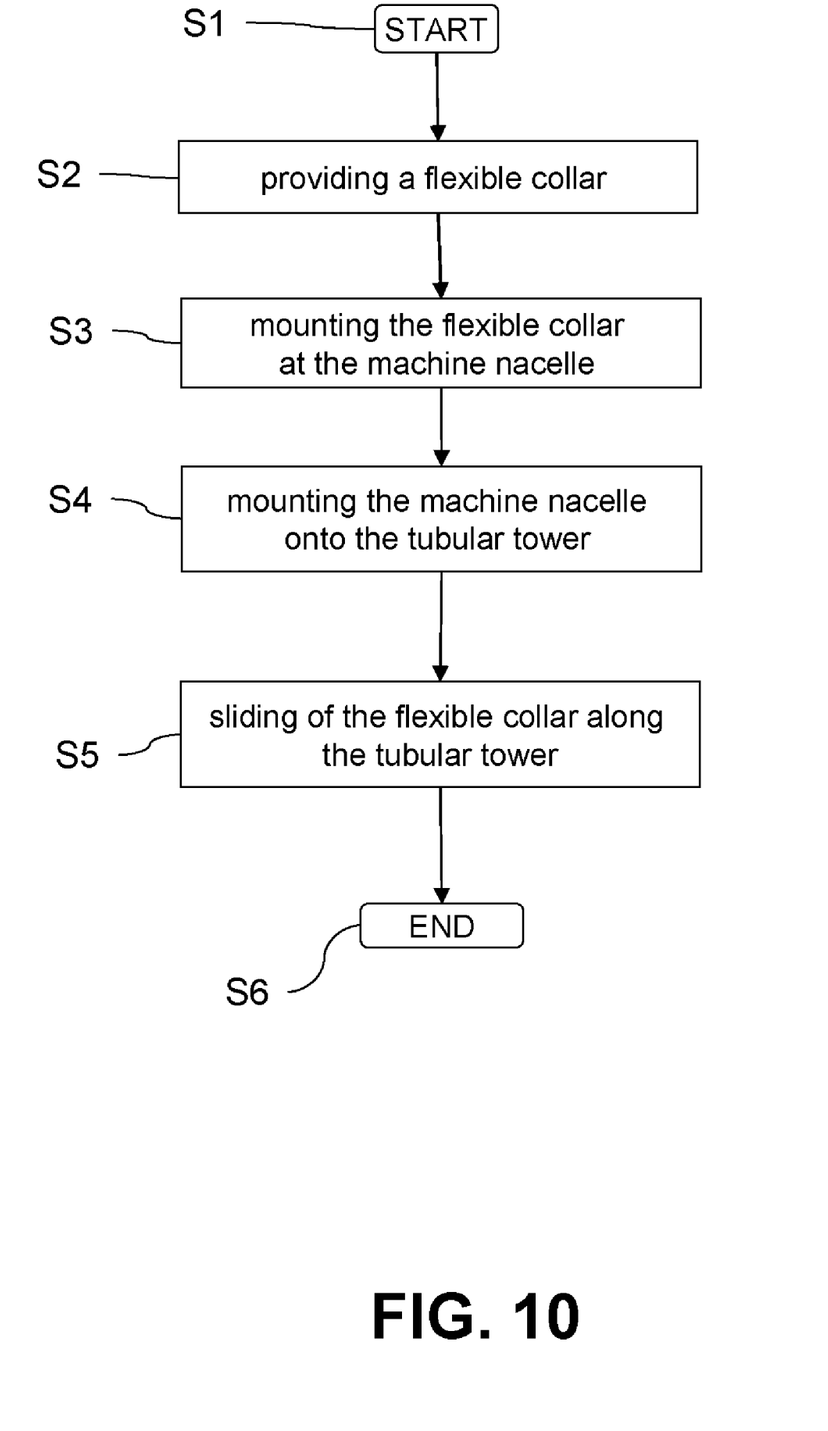
FIG. 10 is a flowchart illustrating a method for protecting a wind turbine from yaw drive grease, according to another typical embodiment.

FIG. 10 is a flowchart of a method for protecting a wind turbine and the environment from yaw drive grease according to another typical embodiment. The method starts at a step S1 wherein at a step S2 a flexible collar is provided inside the machine nacelle 103. Then, at step S3, the flexible collar is mounted the drip pan 202 of the machine nacelle 103. Then, the machine nacelle of the wind turbine is mounted onto the tower at step S4.

The flexible collar is deformed and slides along the tower 102 (step S5). Thus the machine nacelle 103 has been sealed and the procedure is ended at step S6. The flexible collar adapted to fit around an upper end of the tower 102 may have an inner diameter which is smaller than the diameter of the tower 102. Then, grease and/or oil and/or any kind of other contamination emitted from components of the interior of the machine nacelle 103 is collected by means of the drip pan 202.

Figure 11:
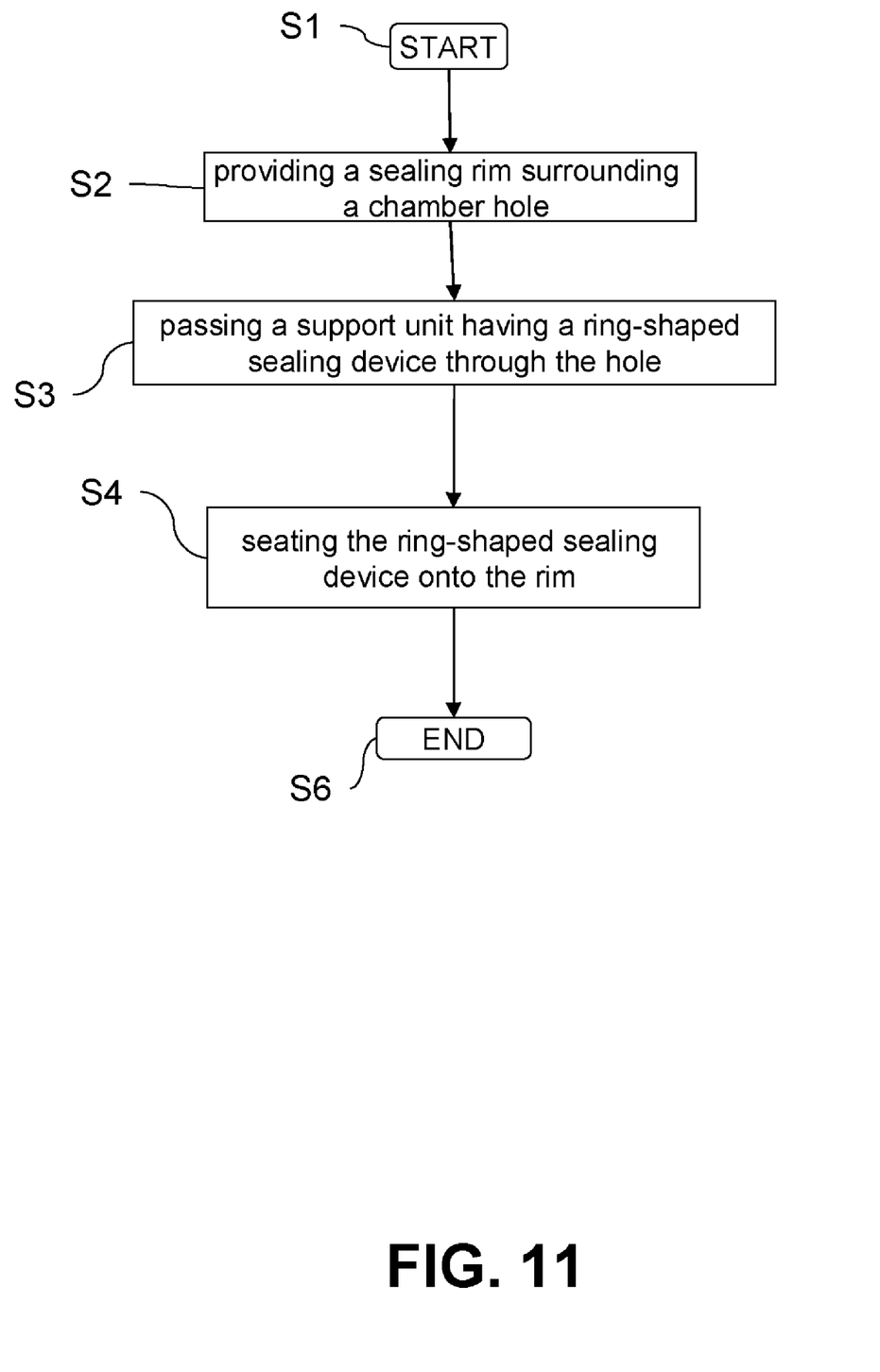
FIG. 11 is a flowchart of a method for sealing a chamber to be sealed according to yet another typical embodiment.

FIG. 11 shows a method for sealing a hole in a chamber to be sealed according to yet another typical embodiment. As shown in FIG. 11, the procedure starts at step S1, and at step S2 a sealing rim surrounding a chamber hole is provided.

Then, at step S3, a support unit having a ring-shaped sealing device fixed around it is passed through the hole of the chamber to be sealed.

Then, at step S4, the ring-shaped sealing device after having passed through the hole and after having snapped back into a straight position is seated onto the rim. At this instance, the chamber to be sealed is sealed by the ring-shaped sealing device, and the procedure is ended at step S6.

The invention has been described on the basis of embodiments which are shown in the appended drawings and from which further advantages and modifications emerge. However, the invention is not restricted to the embodiments described in concrete terms, but rather can be modified and varied in a suitable manner. It lies within the scope of the invention to combine individual features and combinations of features of one embodiment with features and combinations of features of another embodiment in a suitable manner in order to arrive at further embodiments.

It will be apparent to those skilled in the art, based upon the teachings herein, that changes and modifications may be made without departing from the invention disclosed and its broader aspects. That is, all examples set forth herein above are intended to be exemplary and non-limiting.

The invention claimed is:

1. A protection arrangement for a wind turbine comprising a tower, a machine nacelle comprising a yaw drive and a mounting hole into which an upper end of the tower extends, and a rotor having at least one rotor blade and a hub, said protection arrangement further comprising:

a drip pan having a rim surrounding the mounting hole and adapted to collect grease from an interior of the machine nacelle; and a flexible collar adapted to fit around the upper end of the tower and having an outer diameter being larger than the diameter of the mounting hole of the machine nacelle, wherein the flexible collar is adapted to pass through the mounting hole into the interior of the machine nacelle.

2. The protection arrangement in accordance with claim 1, wherein the flexible collar is adapted to snap back after the machine nacelle has been arranged in its operating position.

3. The protection arrangement in accordance with claim 1, wherein the drip pan is adapted to collect at least one of grease, oil and other contamination from the yaw drive or other components within the machine nacelle.

4. The protection arrangement in accordance with claim 1, wherein the collar is made from at least one of an elastic material, a foil having a supporting grid structure, and a steel lip.

5. The protection arrangement in accordance with claim 1, wherein the flexible collar comprises rubber.

6. The protection arrangement in, accordance with claim 1, wherein the flexible collar is provided with a coating.

7. The protection arrangement in accordance with claim 1, wherein the drip pan is made from aluminum, glass fiber, carbon materials, glass fiber reinforced plastic, and other suitable materials.

8. The protection arrangement in accordance with claim 1, wherein the flexible collar has a circular shape.

9. A collar adapted for sealing a mounting hole in a machine nacelle of a wind turbine and to fit around an upper end of a tower of the wind turbine, wherein the collar is flexible and adapted for being inserted into an interior of the machine nacelle via the mounting hole, and wherein an outer diameter of the collar is larger than an inner diameter of the mounting hole.

10. The collar in accordance with claim 9, wherein a sealing rim surrounding the mounting hole and protruding into the interior of the machine nacelle is provided.

11. The collar in accordance with claim 9, wherein the collar is made from at least one of an elastic material, a foil having a supporting grid structure, and a steel lip.

12. The collar in accordance with claim 9, wherein the collar contains rubber.

13. A method for protecting a wind turbine comprising a tower, a machine nacelle comprising a yaw drive and a mounting hole into which an upper end of the tower extends, and a rotor having at least one rotor blade and a hub, said method further comprising:

providing a drip pan having a rim surrounding the mounting hole and adapted to collect grease from an interior of the machine nacelle;

providing a flexible collar adapted to fit around the upper end of the tower and having an outer diameter being larger that the diameter of the mounting hole of the machine nacelle; and mounting the machine nacelle onto the tower, wherein the flexible collar passes through the mounting hole into the interior of the machine nacelle.

14. The method in accordance with claim 13, wherein the flexible collar snaps back after having passed through the mounting hole into the interior of the machine nacelle.

15. The method in accordance with claim 13, wherein at least one of grease, oil and other contamination from the yaw drive, gear boxes, or other components is collected by means of the drip pan.

16. The method in accordance with claim 13, wherein the flexible collar seats onto the rim of the drip pan.

* * * * *